(12) United States Patent
Ginsberg

(10) Patent No.: US 7,310,649 B1
(45) Date of Patent: Dec. 18, 2007

(54) DATA STRUCTURE FOR EFFICIENT ENQUEUING AND DEQUEUING

(75) Inventor: Michael Ginsberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1215 days.

(21) Appl. No.: 09/676,552

(22) Filed: Sep. 30, 2000

Related U.S. Application Data

(60) Provisional application No. 60/204,221, filed on May 15, 2000.

(51) Int. Cl.
*G06F 7/00* (2006.01)
*G06F 9/44* (2006.01)

(52) U.S. Cl. ............................. 707/103 R; 707/103 Y; 718/102

(58) Field of Classification Search ................ 709/100, 709/101, 102; 718/1, 100–108; 719/310–332; 707/103 R, 103 Y
See application file for complete search history.

(56) References Cited

U.S. PATENT DOCUMENTS

| | | | | |
|---|---|---|---|---|
| 4,896,261 A * | 1/1990 | Nolan | ......................... | 710/107 |
| 5,185,861 A * | 2/1993 | Valencia | ..................... | 711/120 |
| 5,379,297 A * | 1/1995 | Glover et al. | ............... | 370/234 |
| 5,452,452 A * | 9/1995 | Gaetner et al. | ............. | 718/103 |
| 5,819,286 A * | 10/1998 | Yang et al. | ..................... | 707/1 |
| 5,872,938 A * | 2/1999 | Williams | .................... | 710/112 |
| 6,003,101 A * | 12/1999 | Williams | .................... | 710/112 |
| 6,044,393 A * | 3/2000 | Donaldson et al. | ......... | 709/100 |
| 6,317,872 B1 * | 11/2001 | Gee et al. | .................... | 717/152 |
| 6,463,484 B1 * | 10/2002 | Moss | ........................... | 710/36 |
| 6,609,161 B1 * | 8/2003 | Young | ........................... | 710/5 |
| 6,964,046 B1 * | 11/2005 | Ogus et al. | ................. | 718/102 |

OTHER PUBLICATIONS

Lee, Pen-Nan et al. "Object oriented Design for a Distributed Priority Queue." IEEE. 1995.*
Gallo, Giorgio et al. "Shortest Path Algorithms". Springer Netherlands. Vol. 13, No. 1 / Dec. 1988.*
Fredman, Michael L. et al. "Fibonacci Heaps and Their Uses in Improved Network Optimization Algorithms." ACM. 1987.*
Liao, Andrew M. "Three Priority Queue Applications Revisited." Algorithmica (1992).*
Black, David L. "Scheduling Support for Concurrency and Parallelism in the Mach Operating System." IEEE. May 1990.*

* cited by examiner

*Primary Examiner*—Lewis A. Bullock, Jr.
(74) *Attorney, Agent, or Firm*—Lee & Hayes, PLLC

(57) ABSTRACT

A data structure for efficient enqueuing and dequeuing is disclosed. The structure includes a horizontally linked list, an array, a vertically linked list, and a head pointer. Entity ranks are distributed over the array, where each array entry has a range of ranks. Each array entry points to null or the entity having the greatest rank within that entry's range. The horizontally linked list links at least a subset of ranked entities. Each entity in the linked list has a unique rank as compared to the ranks of the other entities in the list. Each vertically linked list links a subset of entities having an identical rank. The head pointer points to the entity that has the greatest rank. Methods for adding entities to and removing entities from the data structure are also disclosed. The invention can be used to enqueue threads to and dequeue threads from a priority queue.

18 Claims, 6 Drawing Sheets

DATA STRUCTURE FOR EFFICIENT ENQUEUING AND DEQUEUING

RELATED APPLICATION

This application claims priority to and the benefit of the provisional patent application entitled "A Method to Enqueue and Dequeue from a Priority Queue Efficiently," filed on May 15, 2000, and assigned Ser. No. 60/204,221.

FIELD OF THE INVENTION

This invention generally relates to ranked entities, and more particularly to ranked entities that are prioritized threads.

BACKGROUND OF THE INVENTION

Computer programs are commonly made up of a number of threads that are run within an operating system. Each thread typically has a priority within a range of priority levels. This enables the operating system to determine which threads should have greater priority when a number of different threads are asking to be executed at the same time. Operating systems, depending on their design, can have a large number of different priority levels. For example, some operating systems may have only eight priority levels, while others may have 256 priority levels.

Real-time operating systems are those that guarantee execution of instructions within some predetermined, worst-case time limit, or bound. Because of this bound, real-time operating systems desirably must be able to enqueue prioritized threads to and dequeue prioritized threads from a priority queue that tracks all the threads within a predetermined maximum worst case limit. This is difficult to accomplish for a real-time operating system that has a large number of priority levels, without affecting its predictable performance too greatly. For this and other reasons, there is a need for the present invention.

SUMMARY OF THE INVENTION

The invention relates to a data structure for efficiently ordering a number of ranked entities, including linking a new entity to and delinking an entity from the ranked entities. More particularly, the invention relates to enqueuing prioritized threads to and dequeuing prioritized threads from a priority queue. A data structure in one embodiment includes a horizontally linked list, an array of a number of array entries, one or more vertically linked lists, and a head pointer.

The ranks of the entities are distributed over the array, such that each array entry has a corresponding range of ranks. Each array entry points to either null, or the entity having the greatest rank within that entry's range of ranks. The horizontally linked list links at least a subset of the ranked entities in a descending rank order direction, and optionally in an ascending rank order direction. Each entity in the horizontally linked list has a unique rank as compared to the ranks of the other entities in the horizontally linked list. Each vertically linked list links a subset of the number of entities having an identical rank in a first vertical direction and optionally in a second vertical direction. The head pointer points to the entity that has the greatest rank.

In the case of enqueuing prioritized threads to and dequeuing prioritized threads from a priority queue, the invention provides for efficient enqueuing and dequeuing with minimal impact on system performance, even where there are a large number of different priority levels. However, the invention is applicable to entities other than priorities for threads. The invention specifically encompasses machine-readable media and methods of varying scope. Other aspects, embodiments and advantages of the invention, beyond those described here, will become apparent by reading the detailed description and by referencing the drawings.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Data Structure

Figure 1:
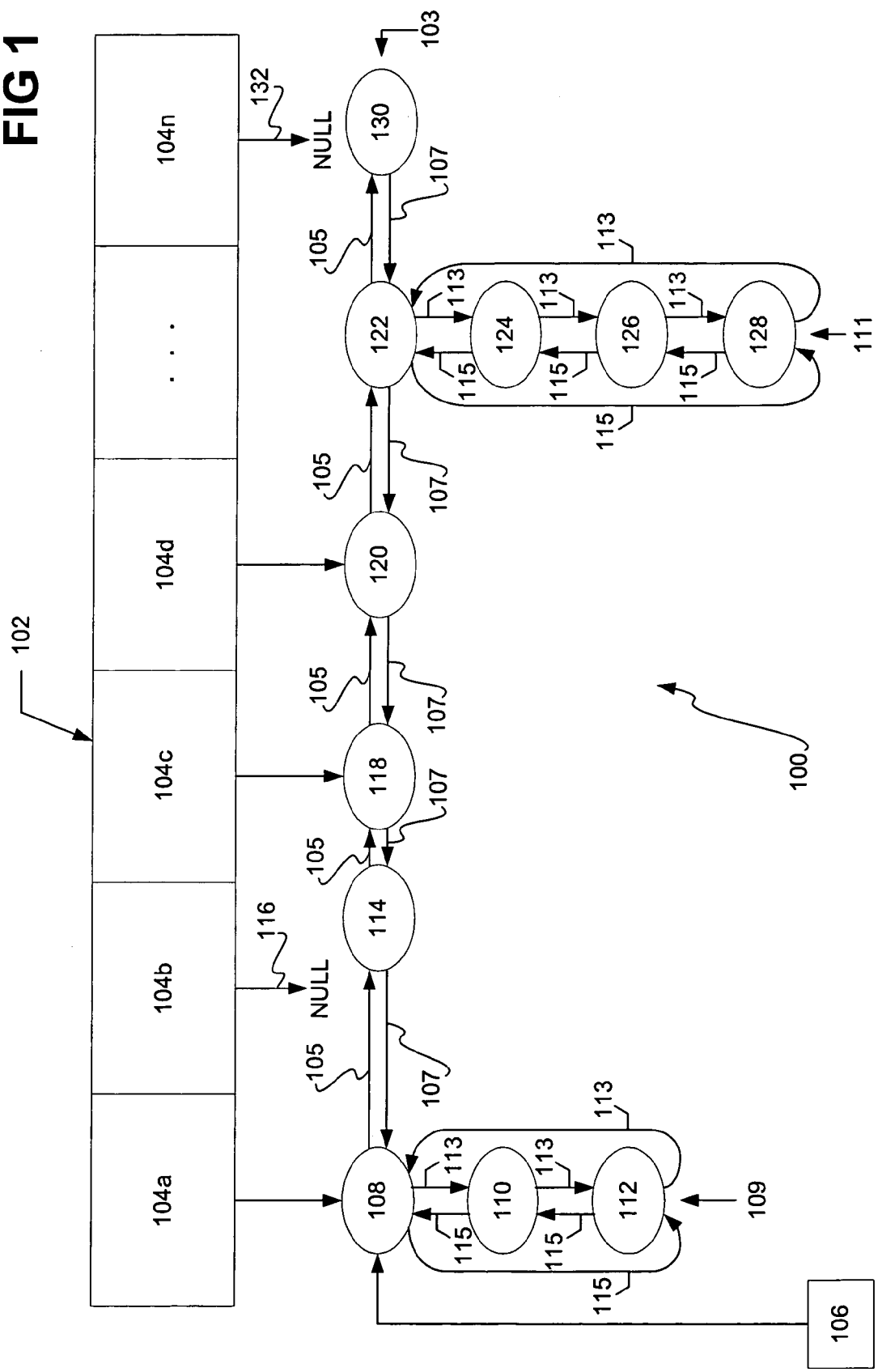
FIG. 1 is a diagram showing a data structure according to an embodiment of the invention.

FIG. 1 is a diagram showing a preferred data structure 100 of the invention. The data structure 100 efficiently orders a number of ranked entities by using an array 102. The ranked entities can be prioritized threads, and the array 102 can be a priority queue. The entities can also be software objects, components, nodes, or other constructs. The array 102 includes a number of array entries 104a, 104b, 104c, 104d, . . . , 104n. The rank of each ranked entity is selected from a number of ranks, which can be thread priorities. For example, there can be 256 ranks, where rank 1 can be considered a greater rank than rank 256. Alternatively, rank 256 can be considered greater than rank 1. The ranks are distributed over the array entries 104 of the array 102, such that each array entry has a corresponding rank range. The rank distribution can be equal or unequal. For example, where there are eight array entries 104, each array entry can correspond to 32 ranks in an equal distribution over the array entries 104. The first array entry would correspond to ranks and have a rank range of 1-32, the second entry would correspond to ranks and have a rank range of 33-64, and so on.

An example is used where there are 20 ranks, distributed equally over five array entries 104a, 104b, 104c, 104d, and 104n. Array entry 104a corresponds to ranks 1-4, array entry 104b corresponds to ranks 5-8, entry 104c corresponds to ranks 9-12, entry 104d to ranks 13-16, and entry 104n to ranks 17-20. Each array entry points to one of the entities that have the greatest rank within the rank range for the array entry. Where there is no such entity, the array entry points to null. This corresponds to the situation where there is no entity having a rank within the rank range for the array entry. Array entry 104a points to the entity 108, which has a rank of 2. There are no entities with a rank between 5 and 8, so the array entry 104b points to null, as indicated by the arrow 116. The array entry 104c points to the entity 118, which has a rank of 11. The array entry 104d points to the entity 120, which has a rank of 13. There are no entities with a rank between 17 and 20, so the array entry 104n points to null, as indicated by the arrow 132.

The data structure 100 includes a horizontally linked list 103. The horizontally linked list 103 links a ranked entity for each of the different ranks of all the ranked entities. The ranked entities linked by horizontally linked list 103 thus each have a unique rank as compared to the ranks of the other entities linked by the list 103. For example, the horizontally linked list 103 links entities 108, 114, 118, 120, 122, and 130, which have ranks 2, 4, 11, 13, 14, and 15, respectively. The horizontally linked list 103 links the entities in a descending rank order, as indicated by the arrows 105. The horizontally linked list 103 links the entities optionally in an ascending rank order, as indicated by the arrows 107.

The data structure 100 can include one or more vertically linked lists, such as the vertically linked lists 109 and 111. Each vertically linked list links ranked entities that have the same rank. For example, the vertically linked list 109 links entities 108, 110, and 112, all of which have a rank of 2. Similarly, the vertically linked list 111 links entities 122, 124, 126, and 128, all of which have a rank of 14. Each vertically linked list links the entities in a first vertical direction, as indicated by the arrows 113. Each vertically linked list links the entities optionally in a second vertical direction, as indicated by the arrows 115. The data structure 100 also can include a head pointer 106 that points to one of the entities having the greatest rank that is within the horizontally linked list 103. For example, the head pointer 106 points to the entity 108, which has a rank of 2.

In summary, the data structure 100 uses the array 102 and the horizontally linked list 103 to efficiently order ranked entities. Where there are ranked entities that have equal rank, the data structure 100 also uses vertically linked lists, such as the vertically linked lists 109 and 111. Between the horizontally linked list 103, and the vertically linked lists 109 and 111, all of the ranked entities are linked into at least one of the linked lists. The next two sections of the detailed description describe how embodiments of the invention add and remove ranked entities to and from the data structure 100.

Removal of Ranked Entities

Figure 2:
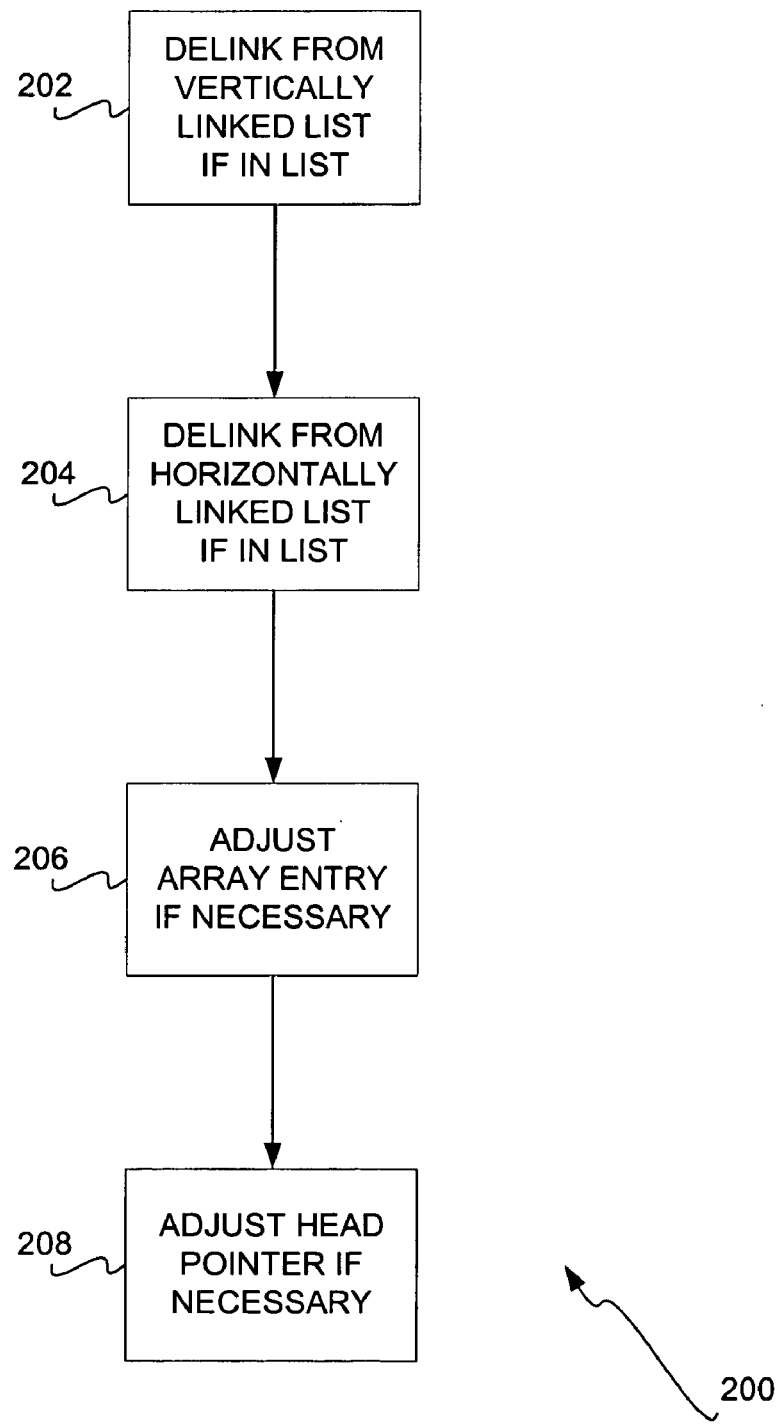
FIG. 2 is a flowchart of a method showing how one embodiment removes an entity from the data structure of FIG. 1.

FIG. 2 is a flowchart showing how one embodiment removes a particular ranked entity from the data structure 100 of FIG. 1. Where the entity is a prioritized thread, and the array 102 of FIG. 1 is a priority queue, the removal process of FIG. 2 can be referred to as dequeuing the prioritized thread from the priority queue. The method 200 first determines whether the particular entity is in a vertically linked list, in 202. The vertically linked list can be the vertically linked list 109 or the vertically linked list 111 of FIG. 1. If the particular entity is in a vertically linked list, it is delinked from the list. This is accomplished in the vertical directions 113 and 115. In the vertical direction 113, the entity that currently points to the particular entity is repointed to the entity to which the particular entity points. Similarly, in the vertical direction 115, the entity that currently points to the particular entity is repointed to the entity to which the particular entity points. The pointers originating from the particular entity are then removed.

Figure 3:
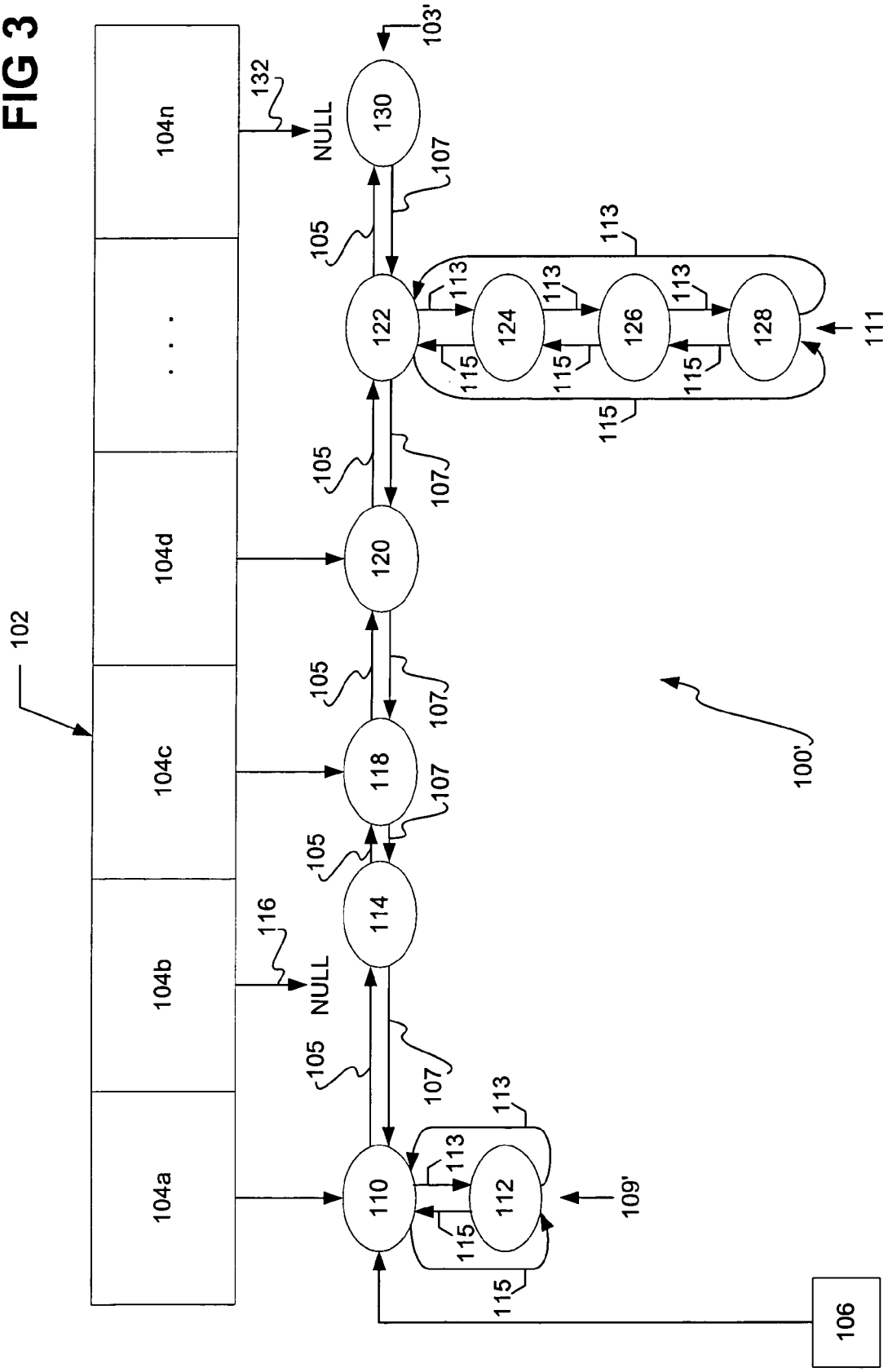
FIG. 3 is a diagram of the data structure of FIG. 1 from which one of the entities has been removed.

For example, if the entity 108 of FIG. 1 were removed from the vertically linked list 109, in the vertical direction 113, the entity 112 would be repointed to the entity 110. In the vertical direction 115, the entity 110 would be repointed to point to the entity 112. The pointers originating from the entity 108 in both the directions 113 and 115 would be removed. FIG. 3 is a diagram showing the data structure 100 of FIG. 1 with the entity 108 removed, where the data structure 100 is now indicated as the data structure 100' to signify the removal of the entity 108. With respect to the vertically linked list 109 of FIG. 1, now indicated as the list 109', the entity 112 now points to the entity 110 in the vertical direction 113, and the entity 110 now points to the entity 112 in the vertical direction 115.

Referring back to FIG. 2, in 204, the method 200 determines whether the particular entity being removed is in the horizontally linked list. The horizontally linked list can be the horizontally linked list 103 of FIG. 1. If the particular entity is in the horizontally linked list, it is delinked from the list. This is accomplished in the descending rank order direction 105 and the ascending rank order direction 107. In the descending rank order direction 105, the entity that currently points to the particular entity is repointed to the entity to which the particular entity points. Similarly, in the ascending rank order direction 107, the entity that currently points to the particular entity is repainted to the entity to which the particular entity points. The pointers originating from the particular entity are then removed.

For example, if the entity 108 of FIG. 1 were removed from the horizontally linked list 103, no repointing would be necessary in the descending rank order direction 105 because the entity 108 is the first entity in the list 103 in this direction. Similarly, in the ascending rank order direction 107, no repainting would be necessary because the entity 108 is the last entity in the list 103 in this direction. However, the pointers originating from and pointing to the entity 108 in both the directions 105 and 107 would be removed. FIG. 3 shows the data structure 100 of FIG. 1 with the entity 108 removed. With respect to the horizontally linked list 103 of FIG. 1, now indicated as the list 103', the entity 108 is no longer present in the list 103.'

Referring back to FIG. 2, in 206, the method 200 determines whether the particular entity to be removed is pointed to by an array entry. The array entry can be one of the array entries 104 of the array 102 of FIG. 1. If the particular entity is pointed to by an array entry, the array entry is adjusted to point to another entity, or to null. If the particular entity was removed from a vertically linked list in 202, then the array entry is adjusted to point to the next entity in the list. That is, the array entry is adjusted to point to the entity to which the particular entity had pointed in the first vertical direction 113.

If the particular entry was not removed from a vertically linked list in 202, but was removed from the horizontally linked list in 204, then the array entry is adjusted to point to the next entity in the list, if the next entity has a rank within the rank range for the array entry. That is, the array entry is adjusted to point to the entity to which the particular entity had pointed to in the descending rank direction 105, if this entity has a rank within the rank range for the array entry. If the particular entity was not removed from a vertically linked list in 202, or was not removed from the horizontally linked list in 204, then the array entry is adjusted to point to null. Similarly, if the particular entity was removed from the horizontally linked list in 204, but the next entity in the list does not have a rank within the range for the array entry, then the array entry is adjusted to point to null.

For example, if the entity 108 of FIG. 1 were removed, then the array entry 104*a* would be adjusted to point to another entity. Because the entity 108 is in the vertically linked list 109, the array entry 104*a* would be adjusted to point to the next entity in the vertically linked list 109 in the vertical direction 113, which is the entity 110. If the entity 108 were not in the vertically linked list 109, the array entry 104*a* would be adjusted to point to the next entity in the horizontally linked list 103 in the descending rank direction 105, which is the entity 114. This is the case where the entities 110 and 112 are not present, such that there is no vertically linked list 109. Note that the entity 114 has a rank within the rank range for the array entry 104*a*. If the entity were not in the vertically linked list 109, and the entity 114 had earlier been removed, such that the entity 118 is the next entity within the horizontally linked list 103, the array entry 104*a* would be adjusted to point to null. This is because the entity 118 has a rank that is not within the rank range for the array entry 104*a*. FIG. 3 shows the data structure 100 of FIG. 1 with the entity 108 removed. With respect to the array entry 104*a*, it now points to the entity 110.

Referring back to FIG. 2, in 208, the method 200 determines whether the particular entity being removed is pointed to by the head pointer. The header pointer can be the head pointer 106 of FIG. 1. If the particular entity is pointed to by the head pointer, the head pointer is adjusted to point to another entity, assuming that the particular entity is not the last entity. If the particular entity was removed from a vertically linked list in 202, then the head pointer is adjusted to point to the next entity in the list. That is, the head pointer is adjusted to point to the entity to which the particular entity had pointed in the first vertical direction 113. If the particular entry was not removed from a vertically linked list in 202, but was removed from the horizontally linked list in 204, then the head pointer is adjusted to point to the next entity in the list. That is, the head pointer is adjusted to point to the entity to which the particular entity had pointed to in the descending rank direction 105.

For example, if the entity 108 of FIG. 1 were removed, then the head pointer 106 would be adjusted to point to another entity. Because the entity 108 is in the vertically linked list 109, the head pointer 106 would be adjusted to point to the next entity in the vertically linked list 109 in the vertical direction 113, which is the entity 110. If the entity 108 were not in the vertically linked list 109, the head pointer 106 would be adjusted to point to the next entity in the horizontally linked list 103 in the descending rank direction 105, which is the entity 114. This is the case where the entities 110 and 112 are not present, such that there is no vertically linked list 109. FIG. 3 shows the data structure 100 of FIG. 1 with the entity 108 removed. With respect to the head pointer 106, it now points to the entity 110.

Addition of Ranked Entities

Figure 4:
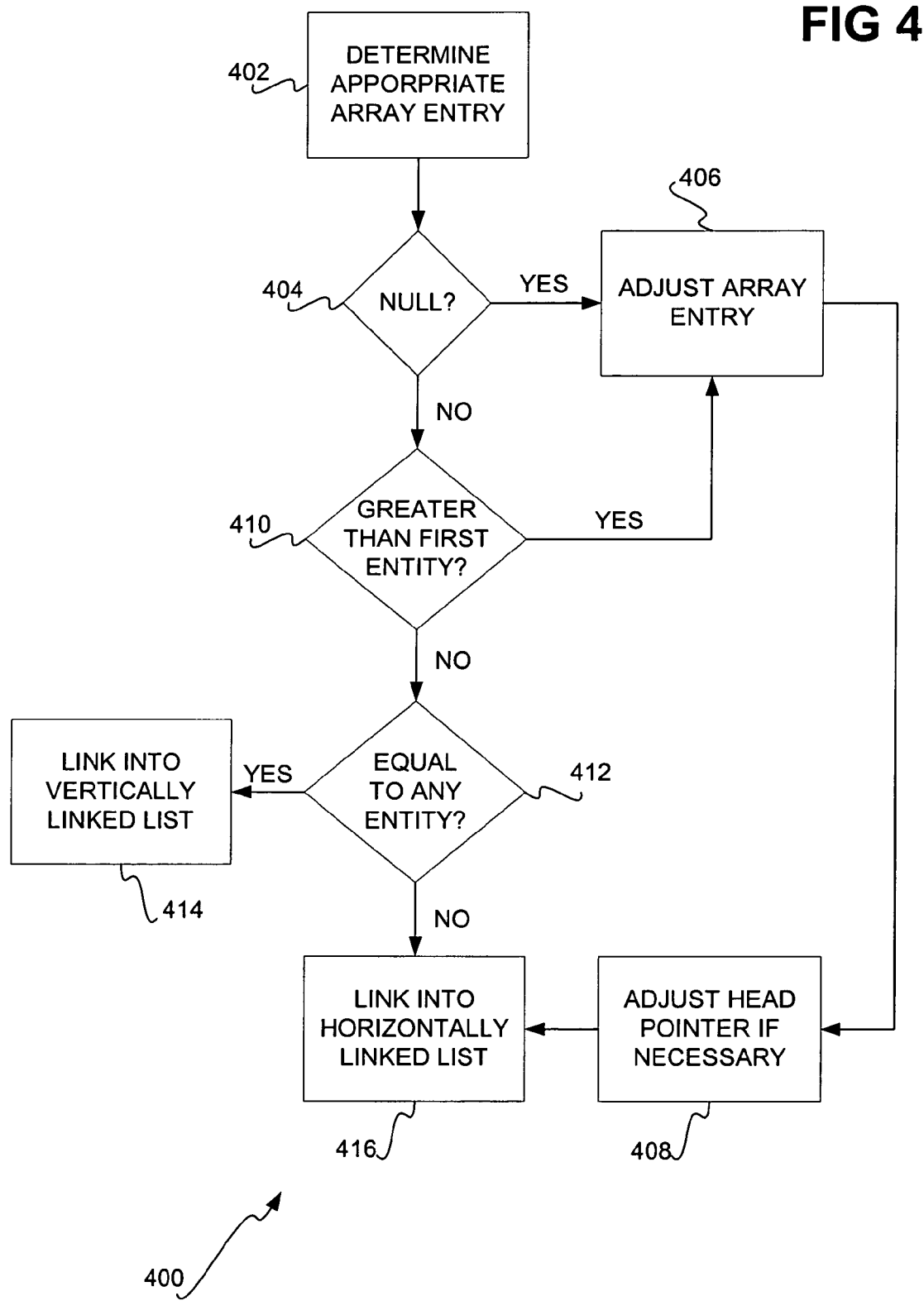
FIG. 4 is a flowchart of a method showing how one embodiment adds a new entity to the data structure of FIG. 1.

FIG. 4 is a flowchart showing how one embodiment adds a new ranked entity to the data structure 100 of FIG. 1. Where the new entity is a prioritized thread, and the array 102 of FIG. 1 is a priority queue, the addition process of FIG. 4 can be referred to as enqueuing the prioritized thread to the priority queue. The method 400 first determines the appropriate array entry for the new entity, in 402. This array entry has a rank range encompassing the rank of the new entity. The array entry can be one of the array entries 104 of the array 102 of FIG. 1. If the array entry currently points to null, then the method 400 proceeds from 404 to 406, where the array entry is adjusted to point to the new entity. In 408, the method 400 adjusts the head pointer if necessary. The head pointer can be the head pointer 106 of FIG. 1. If the rank of the new entity is greater than the rank of the entity currently pointed to by the head pointer 106, then the head pointer is adjusted to point to the new entity instead.

If the array entry does not currently point to null, then the method proceeds to 410 from 404 instead of to 406. If the new entity has a rank greater than the rank of the entity currently pointed to by the array entry, referred to as the first entity in FIG. 4, then the method 400 again proceeds to 406, and then to 408, as has been described. Otherwise, the method proceeds to 412. If the new entity has a rank equal to the rank of any other entity, then the method 400 proceeds from 412 to 414, where the new entity is linked into a vertically linked list. The vertically linked list can be the vertically linked list 109 or the vertically linked list 111 of FIG. 1, or a new vertically linked list. The new entity becomes the new last entity in the vertically linked list.

If there already is a vertically linked list into which the new entity is to be linked, then the new entity is adjusted in the vertical direction 113 to point to the first entity in the list. The new entity is also adjusted in the vertical direction 115 to point to the former last entity in the list. The first entity in the list is adjusted to point to the new entity in the vertical direction 115, because the new entity is now the last entity in the list. The former last entity in the list is adjusted to point to the new entity in the vertical direction 113. If there is not already a vertically linked list into which the new entity is to be linked, then the new entity is the second and the last entity in a new vertically linked list. The first entity in the list is the other entity that has the same rank as the new entity. The first entity is adjusted to point to the new entity in the vertical directions 113 and 115, and the new entity is adjusted to point to the new entity in the vertical directions 113 and 115.

Still referring to FIG. 4, if the new entity has a rank that is not equal to the rank of any other entity, then the method 400 proceeds from 412 to 416, where the new entity is linked into the horizontally linked list. The horizontally linked list can be the horizontally linked list 103 of FIG. 1. The method 400 also proceeds to 416 from 408. The method proceeds to 416 from either 412 or 408 because the new entity has a unique rank as compared to the ranks of the other entities already in the horizontally linked list. There are three cases in 416. The new entity may have a rank greater than the rank of every other entity, in which case the new entity is added to the horizontally linked list at the front, and is the new front entity. The new entity may have a rank less than the rank of every other entity, in which case the new entity is appended to the horizontally linked list at the end, and is the new back entity. The new entity may have a rank that is neither greater than nor less than the rank of every other entity, in which case new entity is inserted within the list. The new entity is inserted within the list such that the rank of a first entity to the left of the new entity is less than the rank of the new entity, which is less than the rank of a second entity to the right of the new entity.

With respect to this last case, prior to insertion of the new entity within the horizontally linked list, the first entity identified in the previous paragraph points to the second entity in the descending rank order direction 105. Similarly, the second entity identified in the previous paragraph points to the first entity in the ascending rank order direction 107. After insertion, in the descending rank order direction 105, the first entity points to the new entity, which points to the second entity. Similarly, in the ascending rank order direction 107, the second entity points to the new entity, which points to the first entity. Where the new entity has a rank greater than the rank of every other entity, and is added to the horizontally linked list at the front, the new entity points to the old front entity in the descending rank order direction 105. The old front entity points to the new entity in the ascending rank order direction 107. Where the new entity has a rank less than the rank of every other entity, and is appended to the horizontally linked list at the end, the new entity points to the old back entity in the ascending rank order direction 107. The old back entity points to the new entity in the descending rank order direction 105.

Figure 5:
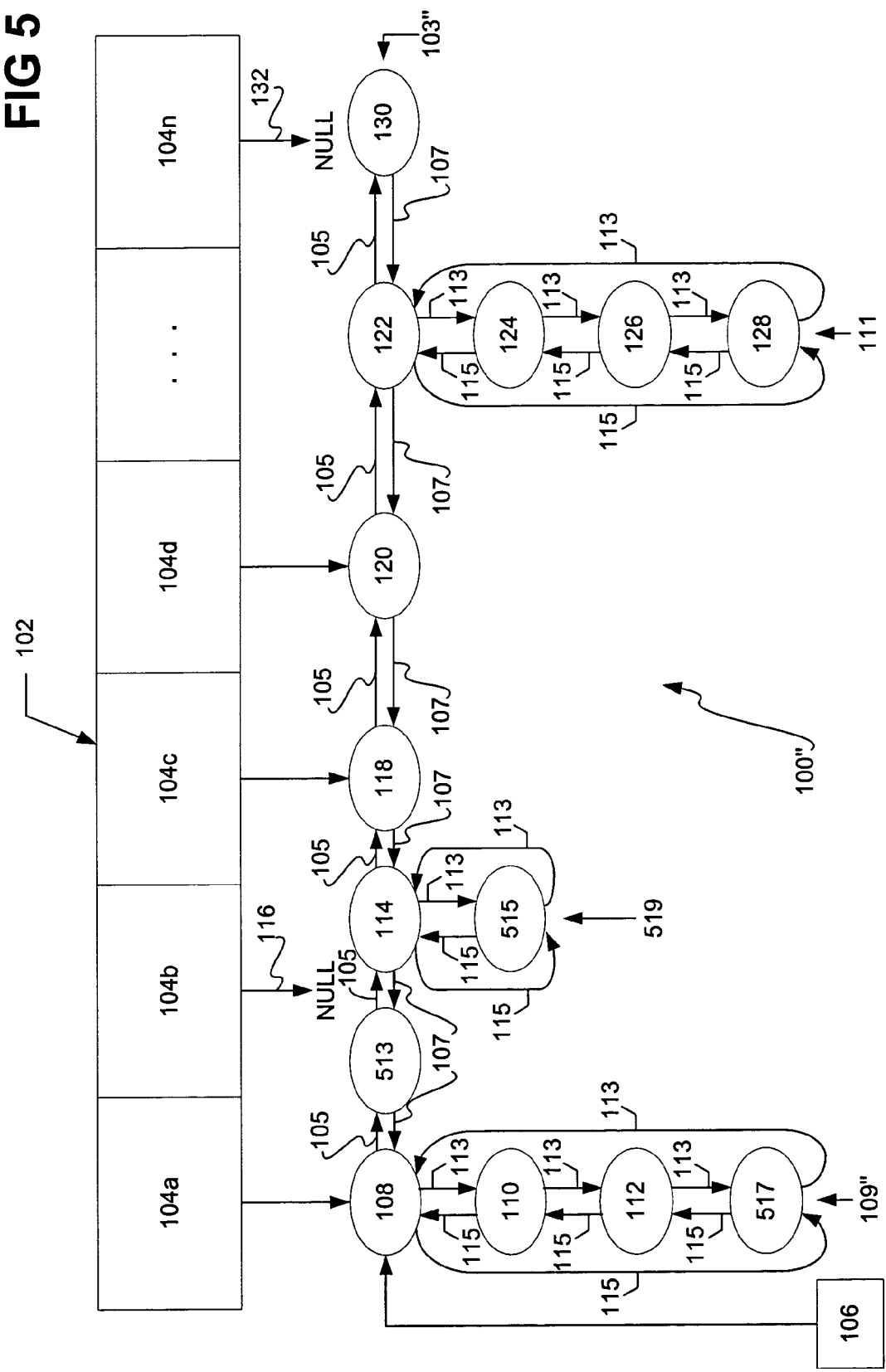
FIG. 5 is a diagram of the data structure of FIG. 1 to which new entities have been added.

As an example of adding entities to vertically and horizontally linked lists, FIG. 5 is a diagram showing the data structure 100 of FIG. 1 with new entities 513, 515, and 517 added. The data structure 100 is indicated in FIG. 5 as the data structure 100'' to signify the addition of these new entities. The new entities 515 and 517 have specifically been added to vertically linked lists, while the new entity 513 has been added to a horizontally linked list. The new entity 517 is added to the already existing vertically linked list 109 of FIG. 1, now indicated as the list 109''. The new entity 515 is added to the new vertically linked list 519. The new entity 513 is added to the horizontally linked list 103, now indicated as the list 103''. The new entity 517 has a rank of 1, which is the same rank as the other entities in the list 109''. Similarly, the new entity 515 has a rank of 4, which is the same rank as the other entity in the list 519, the entity 114. The new entity 513 has a rank of 3, which is between the rank of 2 of the entity 108 and the rank of 4 of the entity 114.

With respect to the new entity 517, the new entity 517 points to the first entity in the list 109'', which is the entity 108, in the vertical direction 113. The new entity 517 points to the former last entity, which is the entity 112, in the vertical direction 115. The entity 108 now points to the new entity 517 in the vertical direction 115. The entity 112 now points to the new entity 517 in the vertical direction 113. With respect to the new entity 515, the new entity 515 points to the first entry in the list 519, which is the entity 114, in both the vertical directions 113 and 115. Similarly, the entity 114 points to the new entity 515 in both the vertical directions 113 and 115. With respect to the new entity 513, the entity 108 now points to the new entity 513 in the descending rank order direction 105, and the new entity 513 points to the entity 114 in the descending rank order direction 105. The entity 114 now points to the new entity 513 in the ascending rank order direction 107, and the new entity 513 points to the entity 108 in the ascending rank order direction 107.

Example Computerized Device

Figure 6:
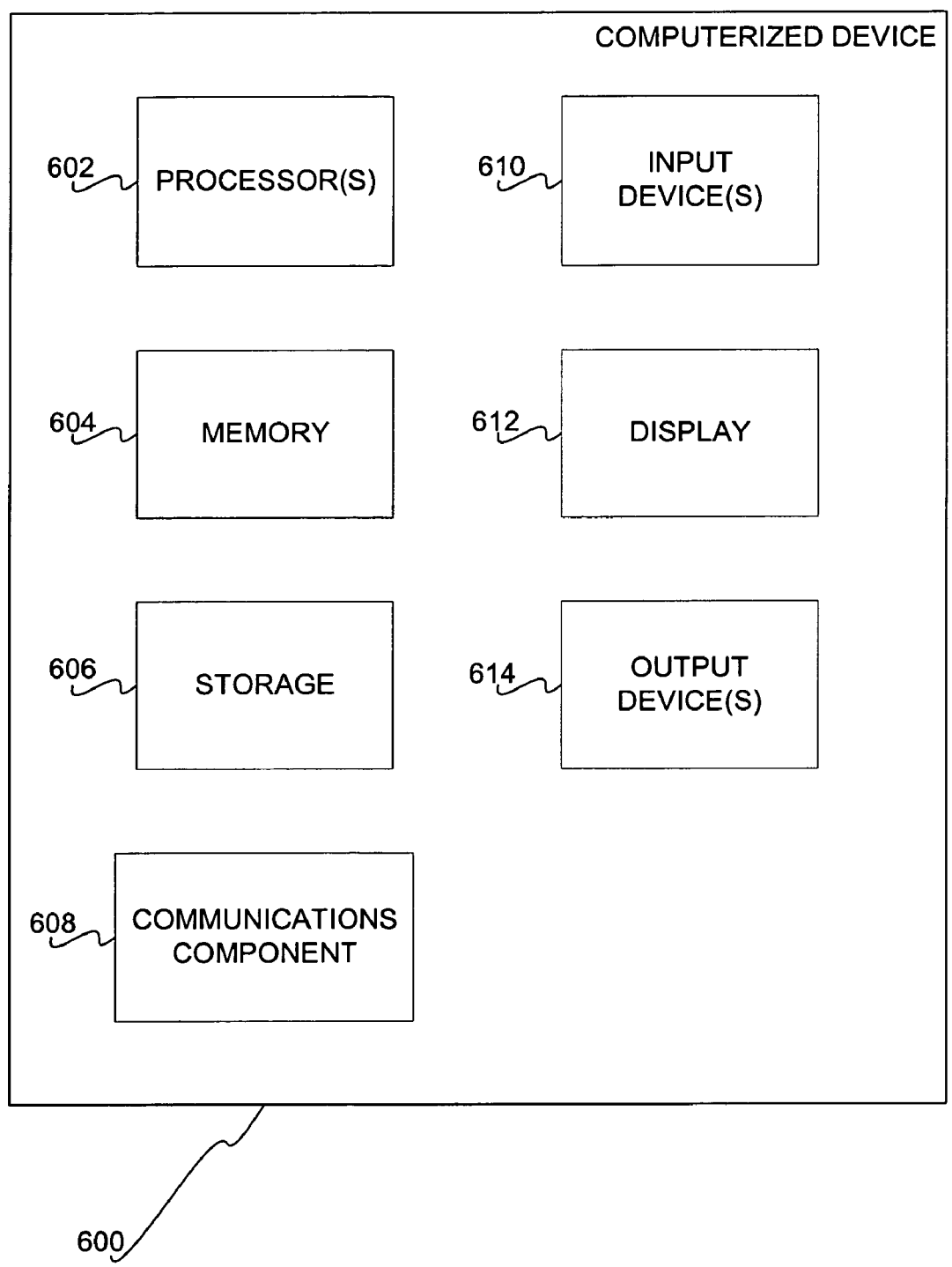
FIG. 6 is a diagram of an example computerized device that can be used to implement the invention.

The invention can be implemented within a computerized environment having one or more computerized devices. The diagram of FIG. 6 shows an example computerized device 600. The example computerized device 600 can be, for example, a desktop computer, a laptop computer, or a personal digital assistant (PDA). The invention may be practiced with other computer system configurations as well, including multiprocessor systems, microprocessor-based or programmable consumer electronics, network computers, minicomputers, and mainframe computers. The invention may be practiced in distributed computing environments where tasks are performed by remote processing devices that are linked through a communications network.

The device 600 includes one or more of the following components: processor(s) 602, memory 604, storage 606, a communications component 608, input device(s) 610, a display 612, and output device(s) 614. For a particular instantiation of the device 600, one or more of these components may not be present. For example, a PDA may not have any output device(s) 614. The description of the device 600 is to be used as an overview of the types of components that typically reside within such a device, and is not meant as a limiting or exhaustive description.

The processor(s) 602 may include a single central-processing unit (CPU), or a plurality of processing units, commonly referred to as a parallel processing environment. The memory 604 may include read-only memory (ROM) and/or random-access memory (RAM). The storage 606 may be any type of storage, such as fixed-media storage devices and removable-media storage devices. Examples of the former include hard disk drives, and flash or other non-volatile memory. Examples of the latter include tape drives, optical drives like CD-ROM drives, and floppy disk drives. The storage devices and their associated machine-readable media provide non-volatile storage of machine-readable instructions, data structures, program modules, and other data. Any type of machine-readable media that can store data and that is accessible by a computer can be used.

The device 600 may operate in a network environment. Examples of networks include the Internet, intranets, extranets, local-area networks (LAN's), and wide-area networks (WAN's). The device 600 may include a communications component 608, which can be present in or attached to the device 600. The component 608 may be one or more of a network card, an Ethernet card, an analog modem, a cable modem, a digital subscriber loop (DSL) modem, and an Integrated Services Digital Network (ISDN) adapter. The input device(s) 610 are the mechanisms by which a user provides input to the device 600. Such device(s) 610 can include keyboards, pointing devices, microphones, joysticks, game pads, and scanners. The display 612 is how the device 600 typically shows output to the user. The display 612 can include cathode-ray tube (CRT) display devices and flat-panel display (FPD) display devices. The device 600 may provide output to the user via other output device(s) 614. The output device(s) 614 can include speakers, printers, and other types of devices.

The methods that have been described can be computer-implemented on the device 600. A computer-implemented method is desirably realized at least in part as one or more programs running on a computer. The programs can be executed from a machine-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device. Furthermore, data structures as have been described can be stored on a machine-readable medium.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

I claim:

1. A method implemented at least in part by a computing device for adding a new entity having a rank within a plurality of N ranks to a plurality of entities as represented in a data structure for efficiently ordering the entities, the entities also having respective ranks within the plurality of N ranks, the method comprising:
   of a plurality of array entries of an array having fewer than N entries over which the plurality of N ranks are distributed, such that the array entries correspond to respective ranges of ranks, determining a particular array entry corresponding to a range of ranks in which the rank of the new entity lies;
   adjusting the particular array entry to point to the new entity in response to determining that the particular array entry currently points to null;
   adjusting the particular array entry to point to the new entity in response to determining that the particular array entry currently points to an entity having a rank less than the rank of the new entity;
   linking the new entity into a vertically linked list linking in at least one direction a corresponding subset of the plurality of entities having an identical rank, in response to determining that the rank of the new entity is equal to the rank of any other entity within the plurality of entities for a respective range of ranks associated with an array entry; and
   otherwise, linking the new entity into a horizontally linked list linking at least a subset of the plurality of entities in at least a descending rank order direction, the entities in the horizontally linked list having unique ranks as compared to the ranks of other entities in the horizontally linked list that spreads over the plurality of ranges of the array, wherein at least one entity of the plurality of entities is a thread, the rank of the entity is a priority for the thread, and the array is a priority queue.

2. The method of claim 1, further comprising adjusting a head pointer pointing to an entity having a greatest rank of the plurality of ranks of the plurality of entities to point to the new entity in response to determining that the rank of the new entity is greater than the rank of the entity of the plurality of entities to which the head pointer currently points.

3. The method of claim 1, wherein the method is performed by execution of a computer program stored on a machine-readable medium by a processor.

4. A machine-readable medium having a data structure stored thereon, the data structure configured to be accessible by a computer, the data structure comprising:
   a plurality of entities having respective ranks within a plurality of N ranks, at least one of the entities being a thread having a rank that is a priority for the thread;
   an array having a plurality of N array entries wherein the array entries are fewer than the plurality of N ranks and are associated with respective ranges of the N ranks, at least one of the array entries pointing to an entity of the plurality of entities having a greatest rank that is within the range of ranks associated with the at least one array entry, wherein the data structure is a priority queue;
   a horizontally linked list of at least a subset of the plurality of entities, each of the entities in the horizontally linked list having a respective unique rank relative to the ranks of the other entities in the horizontally liked list, the horizontally linked list arranged in rank order, wherein at least some of the entities of the horizontally linked list are identified by the array entries as having the greatest rank within that range of ranks; and
   a vertically linked list of a subset of the plurality of entities that links at least one entity of the horizontally linked list with other entities of the plurality of entitles that have identical rank.

5. The machine-readable medium of claim 4, wherein the vertically linked list links the subset of entities in a first vertical direction and in a second vertical direction.

6. The machine-readable medium of claim 4, the data structure further comprising a head pointer, the head pointer pointing to an entity having a greatest rank relative to the ranks of the other entities in the data structure.

7. The machine-readable medium of claim 4, wherein the horizontally linked list is arranged in ascending rank order.

8. The machine-readable medium of claim 4, wherein the plurality of N ranks are equally distributed over the plurality of array entries.

9. The machine-readable medium of claim 4, wherein at least two entities having respectively different ranks correspond to the associated range of ranks of one of the array entries.

10. The machine-readable medium of claim 4, wherein at least one of the array entries points to null indicating that no entity corresponds to the range of ranks associated with the at least one array entry.

11. A method implemented at least in part by a computing device, the method for removing a particular entity from a plurality of entities of a data structure, the entities having respective ranks within a plurality of N ranks, the data structure including an array of one or more array entries, wherein N ranges of ranks are distributed over the array entries, and at least one array entry indicates an entity of the plurality of entities having the highest rank for that associated range of ranks, wherein at least the highest rank entities for the N respective ranges are linked in a horizontally linked list in a rank order such that elements in the horizontally linked list are also the head elements in a vertical linked list to entities having identical ranks, the method comprising:
   in response to determining that the particular entity is present within the vertically linked list, delinking the particular entity from the vertically linked list;
   in response to determining that the particular entity is present within the horizontally linked list, delinking the particular entity from the horizontally linked list;
   in response to determining that one of the array entries points to the particular entity, adjusting the array entry to point to one of null or another one of the plurality of entities; and
   storing the data structure on a single machine-readable medium accessible by the computing device, wherein at least one of the entities is a thread having a rank that is a priority for the thread, and wherein the array is a priority queue.

12. The method of claim 11, wherein the one or more array entries have respective ranges of ranks, and adjusting the array entry further comprises:

in response to determining that the particular entity was present within the vertically linked list, adjusting the array entry to point to a next entity within the vertically linked list.

13. The method of claim 12, wherein adjusting the array entry further comprises:

otherwise, in response to determining that the particular entity was present within the horizontally linked list, and that the rank of a next entity within the horizontally linked list is within the corresponding range of ranks for the array entry, adjusting the array entry to point to the next entity within the horizontally linked list.

14. The method of claim 13, wherein adjusting the array entry further comprises:

otherwise, adjusting the array entry to point to null.

15. The method of claim 11, further comprising:

in response to determining that a head pointer points to the particular entity, adjusting the head pointer to point to another one of the plurality of entities.

16. The method of claim 15, wherein adjusting the head pointer comprises:

in response to determining that the particular entity was present within the vertically linked list, adjusting the head pointer to point to a next entity within the vertically linked list.

17. The method of claim 16, wherein adjusting the head pointer comprises:

otherwise, in response to determining that the particular entity was present within the horizontally linked list, adjusting the head pointer to point to a next entity within the horizontally linked list.

18. The method of claim 11, wherein the method is performed by execution of a computer program stored on a machine-readable medium by a processor.

\* \* \* \* \*